United States Patent [19]
Rodgers

[11] Patent Number: 5,900,678
[45] Date of Patent: May 4, 1999

[54] GEAR SHIFT KNOB

[76] Inventor: Nicholas A. Rodgers, C/o: Shaw & Co. SJO 892, P.O. Box 025216, Miami, Fla. 33102-5216

[21] Appl. No.: 08/970,096

[22] Filed: Nov. 13, 1997

[51] Int. Cl.⁶ ........................................................ B60L 3/00

[52] U.S. Cl. ...................... 307/10.1; 307/10.8; 307/123; 362/491; 340/456

[58] Field of Search ..................................... 307/10.1, 9.1, 307/10.8, 120, 123, 124; 340/456; 362/491, 464, 276

[56] References Cited

U.S. PATENT DOCUMENTS

| 4,848,009 | 7/1989 | Rodgers | 43/17.6 |
| 5,330,282 | 7/1994 | Rodgers | 36/137 |
| 5,550,721 | 8/1996 | Rapisarada | 362/205 |
| 5,552,761 | 9/1996 | Kazyaka | 340/456 |
| 5,602,525 | 2/1997 | Hsu | 340/456 |
| 5,619,182 | 4/1997 | Robb | 340/479 |

*Primary Examiner*—Jeffrey Gaffin
*Assistant Examiner*—Edwin D. Garlepp
*Attorney, Agent, or Firm*—Robert L. Westell; Dowell & Dowell, P.C.

[57] ABSTRACT

Novel gear shift knob flashes randomly utilizing a battery, motion responsive switch, a timing and illumination circuit.

18 Claims, 4 Drawing Sheets

GEAR SHIFT KNOB

BACKGROUND OF THE INVENTION

1. Field of the Invention

This invention relates to a gear shift knob designed to provide an illuminated novelty.

2. Description of the Related Art

It is known to replace the standard knob on a gear shift lever with one of decorative design.

BRIEF SUMMARY OF THE INVENTION

This invention provides a knob having an illumination circuit with a light arranged to be illuminated during an interval initiated by a motion responsive switch.

The knob is preferably shaped to attach to the gear shift lever in the same way as the knob it usually replaces. Such knob will usually screw onto the gear lever.

A light, usually an LED is arranged to radiate from the novel knob and to produce the desired lighting effect, whether continuous light, flashing or other intermittent ON-OFF effect. Means thus may be provided to turn the illumination circuit ON and OFF so that an intermittent, and/or flashing effect is produced.

The novel knob will typically contain a circuitry including a battery, a motion responsive switch, a timing circuit and an illumination circuit with the circuitry responsive to the OFF-to-ON transition of said motion responsive switch to start said timing circuit timing an interval, and means for connecting said battery.

The light source will commonly be an LED.

The light source will commonly be molded into clear plastic and encapsulated therein with the timing and illumination circuits.

The motion causing motion responsive switch operation will usually be the automobile motion but could also be the motion of shifting gears. In a preferred form of the invention at least one, and preferably a bundle of optic fibres is arranged to receive light from the LED. Such fibres may, when such LED is on, be selected to radiate either from their output ends, or through both the sides, and the ends, in either case for a novel effect. Most commonly the fibre will be treated to radiate transversely along its length.

In a different preferred form of the invention the clear plastic of the knob contains an advertising plaque or flag or other form of indicia. In a preferred form for lighting the indicia an optic fibre extends longitudinally adjacent the plaque, flag or indicia. An LED is provided at one end to radiate light along the fibre. The fibre is treated to radiate transversely and in a direction to illuminate the plaque or flag. Preferably there is provided an LED shining into each end of such optic fibre.

The means energizing the light source between turning it ON and turning it OFF may be arranged to produce a flashing or intermittent effect.

In one of its preferred forms, the motion responsive switch has, when in motion, frequent transitions from OFF-to-ON. Such a transition starts the timing of an interval by timing means. The timing circuit is designed to connect battery power to the illumination circuit illumination during the duration of the timing interval and to prevent it at other times. The illumination circuit may be so arranged that the light source is flashing during the timing of the interval instead of continuously on.

The motion responsive switch may typically be a ball switch or a mercury switch but could also be a switch using a stationery contact for use in cooperation with a movable contact on a flexible stem spring such as the helical spring shown in such patents as U.S. Pat. No. 5,599,088 to Chien and U.S. Pat. No. 5,408,764 to Wut.

In another preferred form of the invention the timing circuit is not used and the flexible stem spring is used as the motion responsive switch and as a timing spring, connected between light source, when the flexible stem switch closes the circuit and connects battery to source to turn it ON and opens it to turn it OFF, with the dwell time of the movable on the fixed contact determining the flash length.

BRIEF DESCRIPTION OF THE SEVERAL VIEWS OF THE DRAWINGS

In drawings which illustrate a preferred embodiment of the invention.

DETAILED DESCRIPTION OF THE INVENTION

Figure 1:
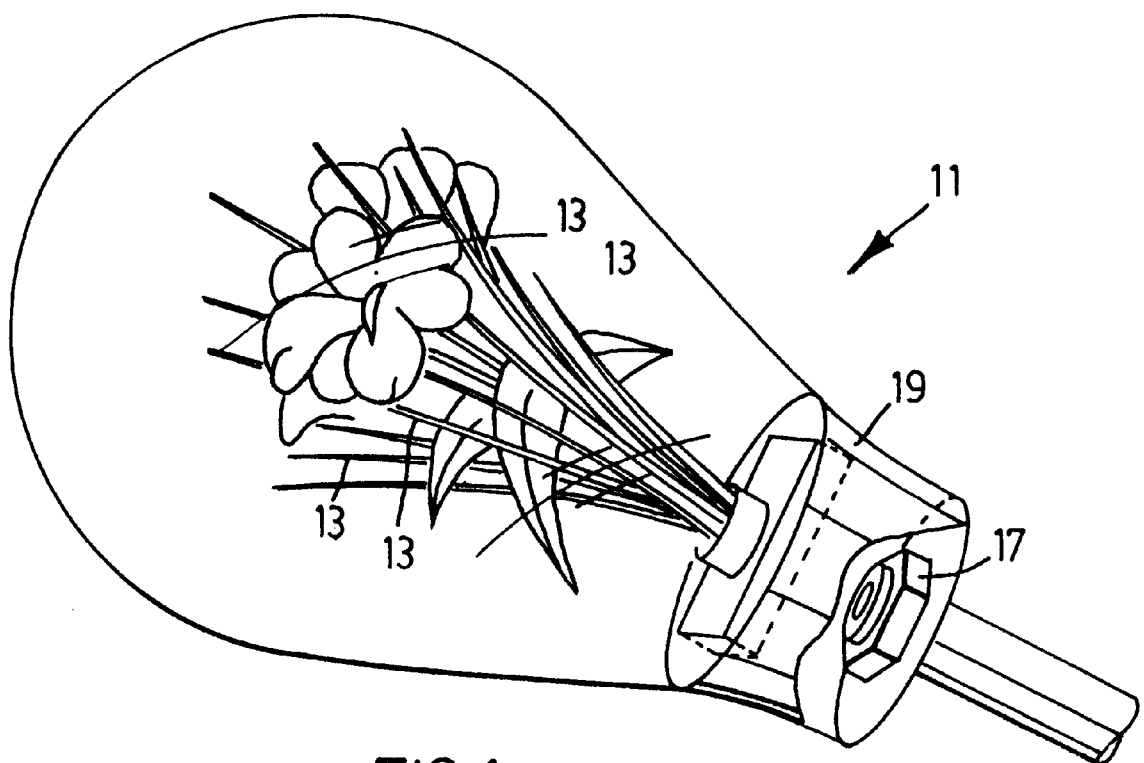
FIG. 1 shows the physical arrangement of one of the preferred forms of the invention.

In the drawings FIG. 1 shows a knob in accord with the invention having a cast clear acrylic body 11 having an encapsulated flower arrangement designs. Among the representations of flowers are encapsulated fibre optic strands 13 intended to visually combine with the floral arrangement.

Figure 2:
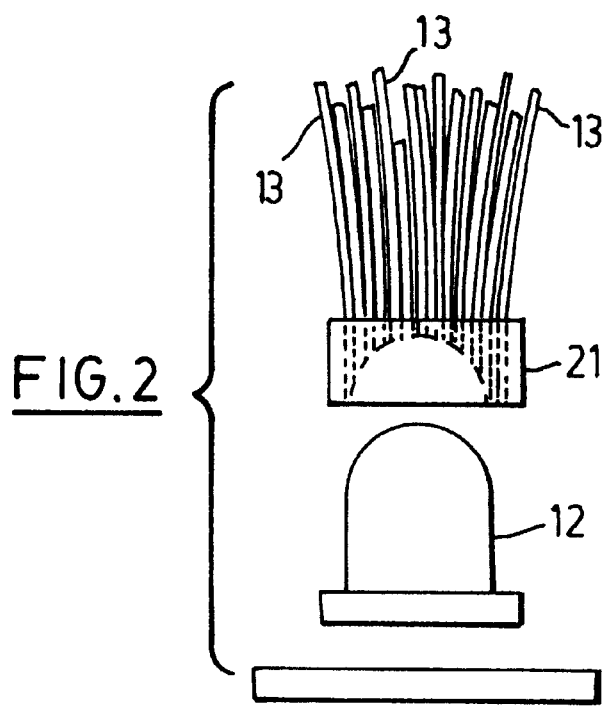
FIG. 2 shows schematically the relationship of an LED to optic fibres in the device of FIG. 1.

FIG. 2 indicates a preferred physical arrangement of the components for creating the illumination. The circuitry has a centrally located upwardly directed LED 12. ('LED' is used herein to include the lens). Structure, not shown in detail, arranges the input ends of the fibres in the concave downward arrangement shown, to receive the light from the LED. At the lower end of the knob, an upwardly directed bore in the plastic, not shown, leads to the mounting nut 17.

Although, the circuitry module 19, lower band 21 of the fibre optics bundle and nut are shown, these will customarily be hidden by being enclosed in opaque plastic.

Figure 3:
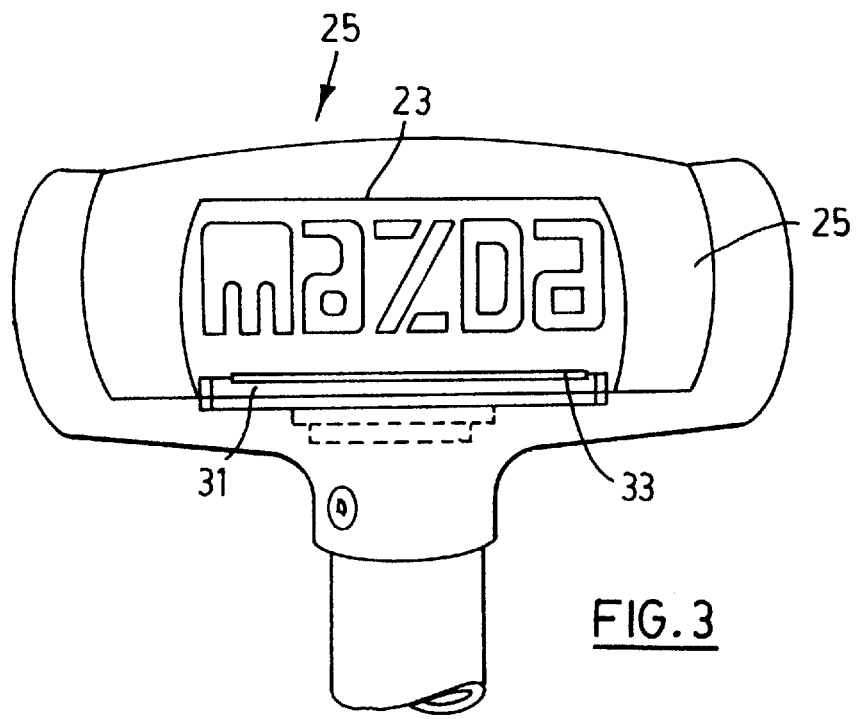
FIG. 3 shows an alternate physical form of the invention.

An alternative shift bar or knob 21 for a gear lever is shown in FIG. 3. A metal or plastic mount holds a clear cylinder in which is cast a flag or plaque 23 bearing an advertising slogan (or other indicia), and below the plaque or flag 23 and slightly rearwardly thereof is shown a focus tube 27, to be described.

Figure 4:
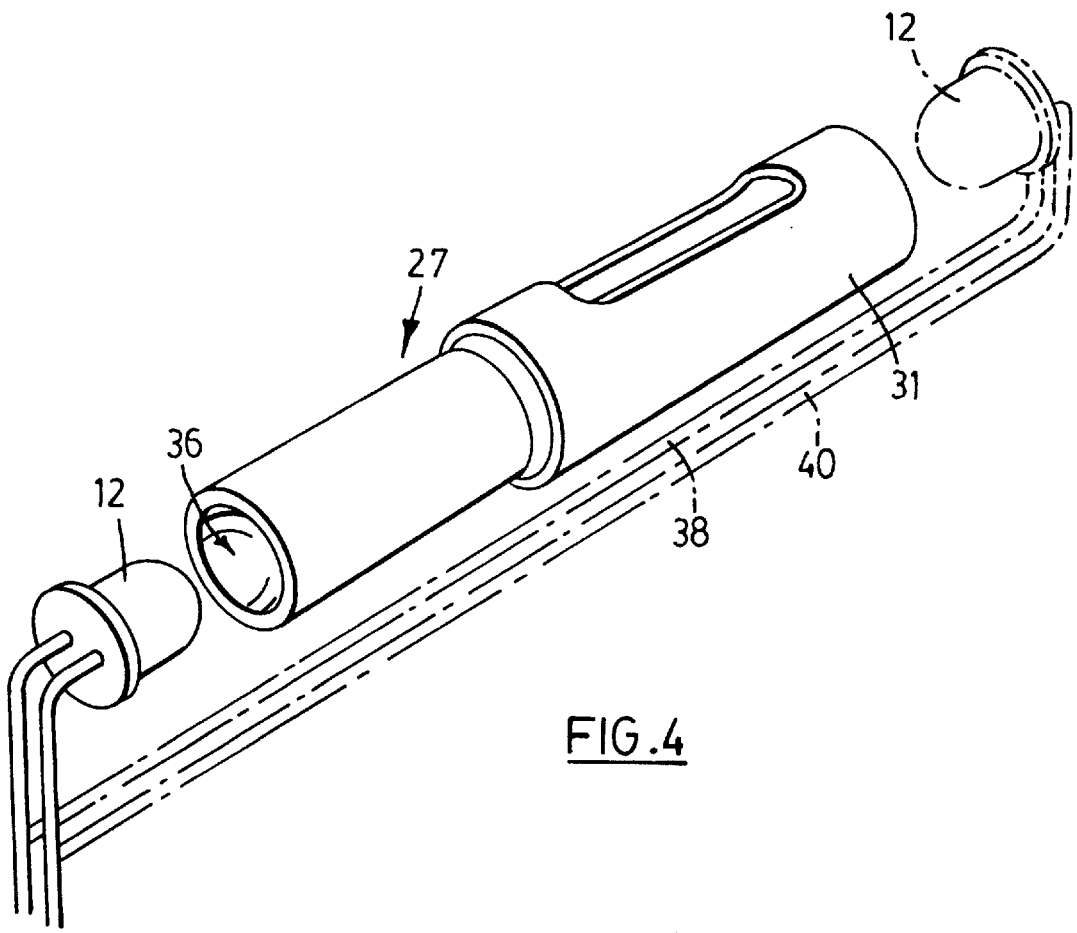
FIG. 4 shows a usual arrangement for a focus tube.

The focus tube is shown in FIG. 4 where a schematic exploded view shows a length of optic fibre 27 for containment in a sleeve 31 having an upwardly directed slot 33 located so that light passing upwardly therethrough will illuminate the plaque or flag 23. An LED 12 is arranged at one end and preferably end of the fibre which may be provided with concavities as shown at 36 to receive them.

Figure 5:
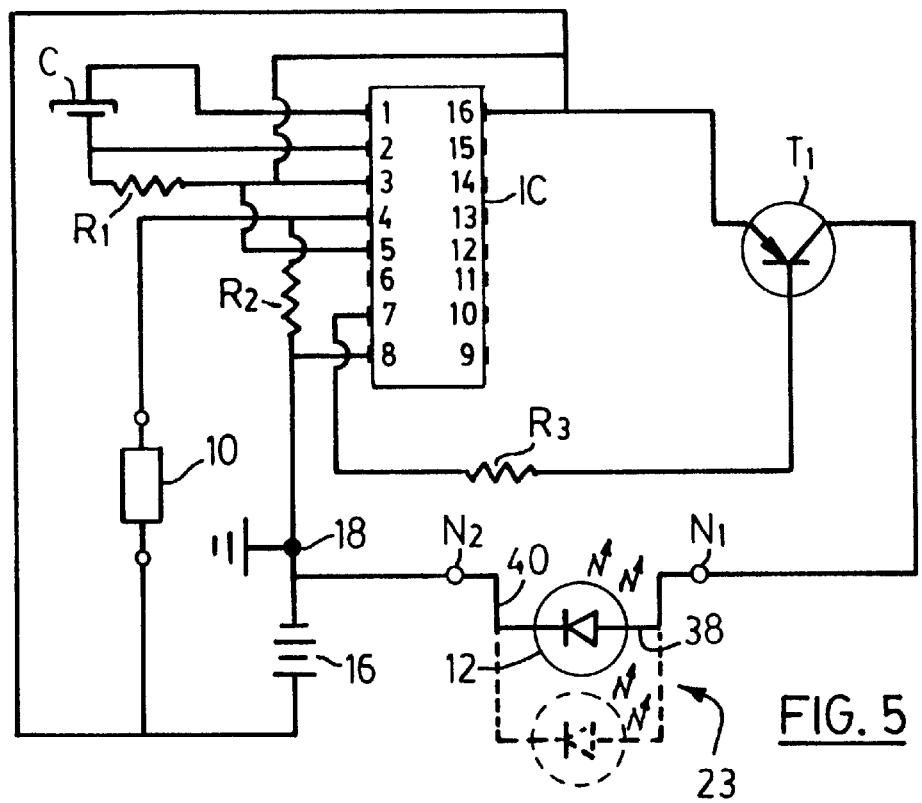
FIG. 5 shows a preferred timing circuit with illumination circuit attached.
Figure 6:
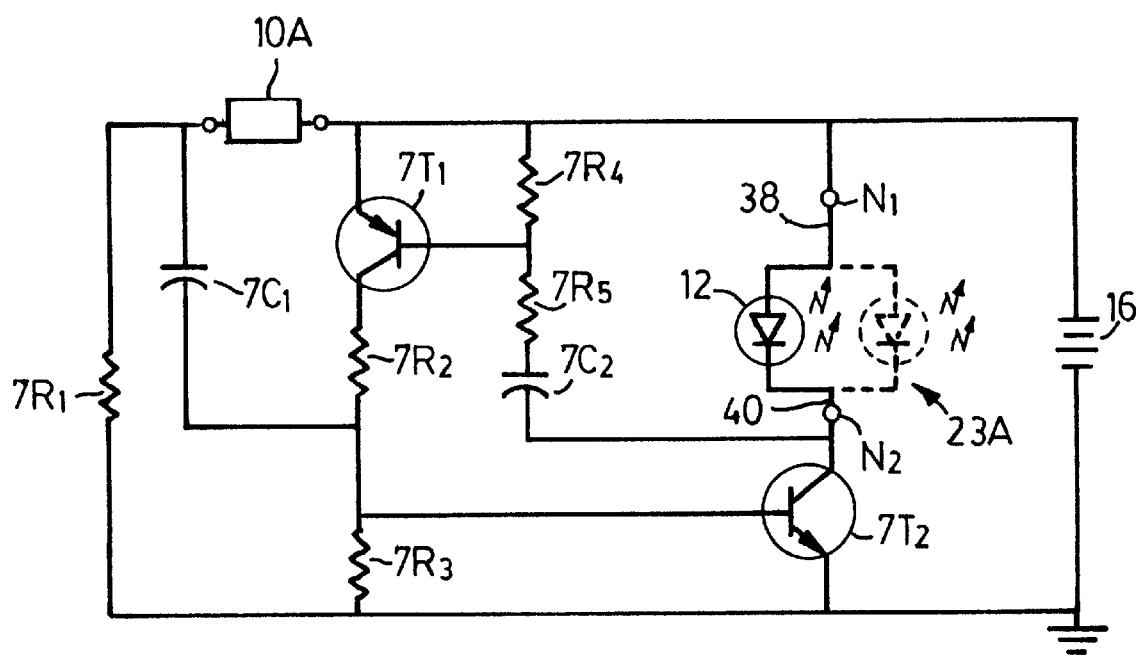
FIG. 6 shows an alternative timing circuit.

The LED's 12 are connected in parallel as shown in FIGS. 5 and 6. The leads 38, 40 for the LEDs are shown. The fibre optic 28 is treated or 'scuffed' so that an amount of the rays travelling therealong radiate (transversely) upward to illuminate the indicia or flag 23.

FIG. 5 shows a first timing circuit for controlling the LED or LEDs 12.

FIG. 5 shows in some detail a preferred timing circuit. The battery 16 is connectable over motion responsive switch 10 to terminal 4 of integrated circuit IC. Preferred values for the circuit elements are as follows:

IC—INTEGRATED CIRCUIT #RR8503 MC 14528
T1—TRANSISTOR #2N3906
C—CAPACITOR 0.47 $\mu$F at 30 V
16—BATTERY 3V
12—LIGHT SOURCE (LED)
10—MOTION RESPONSIVE SWITCH (PREFERABLY BALL SWITCH) MERCURY OR OTHERWISE
R1—RESISTOR 1 MEGOHM 1⅛ W
R2—RESISTOR 1 MEGOHM 1⅛ W
R3—RESISTOR 1 MEGOHM 1⅛ W (The integrated circuit and transistor referred to above are both available from Motorola Canada Limited, 3125 Steeles Avenue East, North York, Ontario, Canada).

Initially the switch 10 will be open or closed. If open it will await an OFF-to-ON transition. If closed the power to the light will have been turned off as hereinafter described and the circuit will await the ON-to-OFF transition followed by an OFF-to-ON, to commence operation as now described.

In operation with knob 11 or 25 stationary the timing circuit will be quiescent but capacity C will be charged to the value of battery 16 (here 3V). Pin 4 of the integrated circuit will be held at 0 volts which is the voltage arbitrarily designated at node 18. The integrated circuit IC will be in reset condition having the effect that there will be a positive voltage at pin 7, rendering the transistor T1 (i.e. the power switch) non-conducting to the illumination circuit and maintaining the lights in the illumination circuit 23, off.

When motion of the knob causes switch 10 to close, (or to open and close) creating a connection between battery 16 positive and pin 4, (that is the switch 10 has changed state from "OFF" to "ON"; the (0–1) or 0 V to 3V transition at pin 4 causes the integrated circuit IC to go to "set" condition causing pin 7 of IC to go to 0 volts. This causes transistor T1 to conduct, supplying power to the illumination circuit 23 for the timed or power interval, as determined by IC, C and R1. The 'set' condition of integrated circuit IC connects pin 3 with node 18 and in a time determined by C and R1 the circuit is returned to reset condition, taking pin 7 positive, terminating conduction through T1, extinguishing LEDs 12 and allowing C to recharge. The circuitry is further designed so that switch 10 must be turned OFF and ON again (with the OFF to ON transition occurring outside the power interval), before integrated circuit can again be activated to set state.

It will be appreciated that the 'ground' shown at node 18 is instrument ground only and is unconnected to anything outside the circuit. The choice of node 18 as 'ground' is somewhat arbitrary but assists on the description of the circuit.

A description of various motion responsive switches follows.

An alternative circuit timing is shown in FIG. 6.

In FIG. 6 the integrated circuit IC is replaced by discrete elements. A schematic distribution of these elements in the novelty article is not shown but it will be realized that they are placed as found convenient in the casing while position of the lights will be located as described in connection with the illumination circuit.

Figure 7:
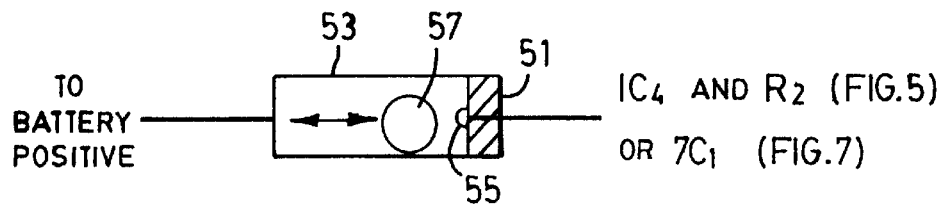
FIG. 7 shows a typical ball switch.

Exemplary only values of the circuit elements of FIG. 7 are indicated below:

7R1—1 MEGOHM
7R2—1 KILOHM
7R3—100 KILOHM
7R4—38 KILOHM
7R5—1 KOLOHM
7C1—1 $\mu$f
7C2—10 $\mu$f
7T1—2N3906PNP
7T2—2N3905 NPN
23A—ILLUMINATION CIRCUIT
10—MOTION RESPONSIVE SWITCH

FIG. 6 shows a simple one shot circuit.

When motion responsive switch 10A is closed providing an OFF-to-ON transition, it applies positive voltage to 7C1 and the base of 7T2. This will cause 7T2 to conduct. This, in turn, supplies battery power to illumination circuit 23A.

7T2 conducting also connects the negative side of 7C2 to the negative side of the battery. This will place the base of 7T1 at a potential less positive than its emitter which will cause it to conduct. 7T1 supplies positive voltage to the voltage divider 7R2 and 7R3 which supplies positive voltage to the base of 7T2. This will hold 7T2 on after 7C1 has charged and no longer conducts current to the base of T2.

The RC network formed by the resistors 7R4, 7R5 and 7C2 determines the length of time the LEDs will be on. When 7C2 charges, the potential on the base of 7T1 becomes less negative and 7T1 will cease to conduct. This, in turn removes the positive bias from the base of 7T2 (which acts as the power switch T1 of FIGS. 1A, 1B) which will turn off, terminating the power interval and the flow of power to the illumination circuit 23A.

To repeat the cycle, switch 10A must be opened and then reclosed (the latter outside a power interval) to initiate the timing of a new power interval.

Thus if, for any reason, switch 10A remains closed the LEDs will be extinguished by the circuit described above after the interval illumination duration provided by the RC network.

The circuit of FIG. 6 may be provided with any motion responsive switch.

It cannot be said that the circuit of FIG. 6 is always preferable over that of FIG. 5 or vice versa. The circuitry of FIG. 6 is somewhat simpler. However, the circuitry of FIG. 5 may be made extremely compact. The integrated circuit of FIG. 5 may take advantages of a process called 'on board integrated circuitry'. In this process the integrated circuit, IC, is actually built into a (very small) circuit board and covered with a dot of epoxy. The size of the integrated circuit of FIG. 5 is about ³⁄₁₆ inch in diameter and only ¹⁄₃₂ of an inch thick.

The circuits of FIG. 5 or FIG. 6 would require 3V power but it is preferred to use two 1½V batteries in series. These batteries are collectively shown and referred to as battery 16.

The alternative motion responsive switches will now be discussed. Switches 10 or 10A may be mercury switches although these are sometimes questioned environmentally. Switches 10 or 10A may also be ball switches as shown in FIG. 7 where a conducting cylinder 53 connected to the battery has an insulated end which receives conducting terminal 55 connected to IC terminal 4 and R2. Ball 57 rolling to contact terminal 55 closes (causes an OFF-to-ON transition in) the switch which is otherwise open.

A third motion responsive switch has a terminal 61 connected to the battery and a terminal 63 which is the cantilever end of a flexible stem switch. In motion the cantilever end touches terminal 61 from time to time, and closes the switch which is otherwise open due to the resilience of the flexible stem.

A helical spring is shown as the stem but this could also be a resilient linear stem. With such a switch the weight on the end may be increased to increase motion responsiveness or resilience may be dampered to increase dwell time and hence the light ON period.

Figure 8:
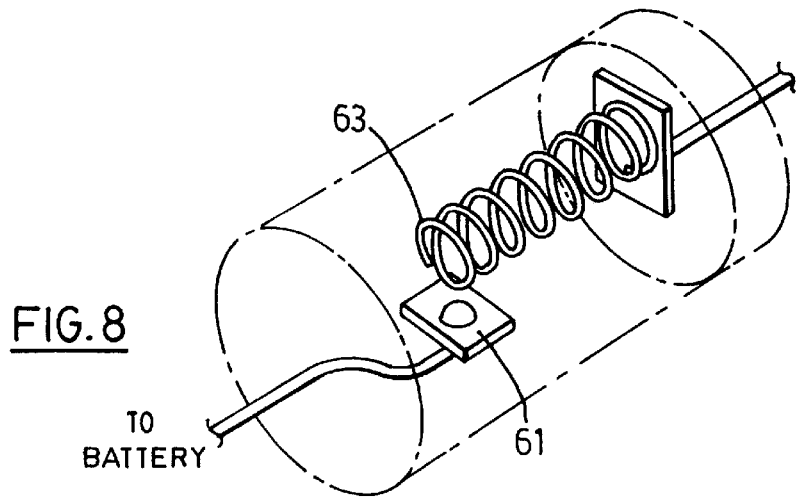
FIG. 8 shows a flexible stem switch.

The switch of FIG. 8 may be used as the motion responsive switch 10 of FIGS. 5 or 6.

Figure 9:
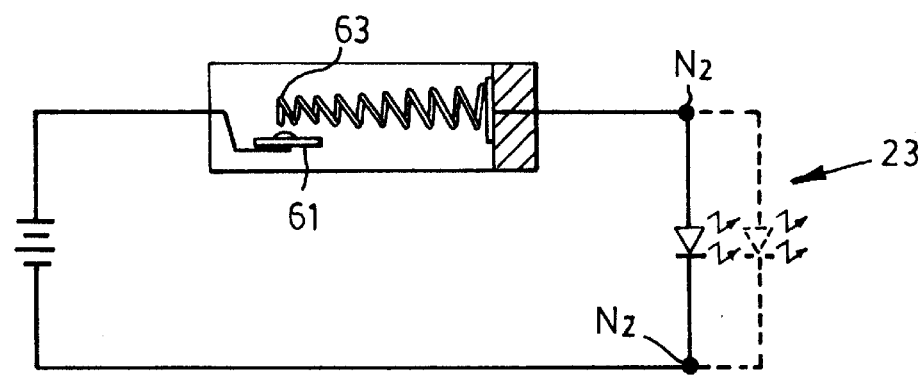
FIG. 9 shows a circuit using the stem switch without a timing circuit.

But the switch of FIG. 8 may also be used in the simple circuit of FIG. 9.

A closed switch causes the battery to light the illumination circuit which is OFF when the switch is open. The illumination is on for the dwell time of closure. This circuit may be used with the devices of FIGS. 1 and 2 if space is available for a resilient stem.

All motion responsive switches shown are reversible.

In the circuits above described the LED's would be on for the duration of the timed interval (FIGS. 5 and 6) or the dwell time (FIG. 9).

Figure 10:
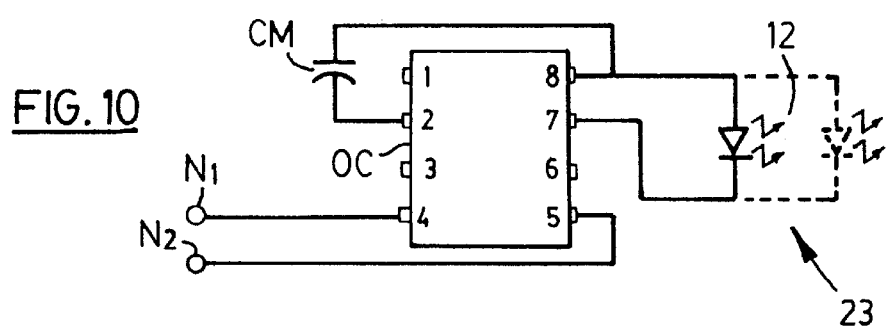
FIG. 10 shows an illumination circuit in accord with the invention.

If it is desired to have the LEDs flash during such time periods or dwell time the circuit should in FIG. 10 may be used. It is to be considered as connected at the nodes N1 N2 of FIGS. 5,6 or 9 respectively, instead of the LEDs shown.

For the oscillator chip OC, I prefer to use a National Semi-conductor chip 3909 connected as an oscillator as shown in FIG. 10. The basic multi-vibrator circuit of oscillator O.C. is modified by the capacitor CM to produce the desired flashing rate.

When power appears at nodes N1 and N2 in whichever of the circuits of FIG. 5, FIG. 6 or FIG. 9, a quartz crystal in chip OC vibrates to cause power to be applied periodically, (as selected) to the illumination circuit 23 input. The rate of flashing can be varied by changing the value of capacitor CM connected between terminals 2 and 8 of chip OC.

If desired any other suitable sequence controller with output to LED's may be connected to nodes N1 and N2 to determine the performance of the LED's during the timed interval.

I claim:

1. In combination, a gear shift know body and a gear shift lever, said lever having a free end, said knob body having means for attachment to said free end, said body having a battery, at least one LED and a motion responsive switch, responsive to movement of said gear shift lever, said motion responsive switch having ON and OFF states and being responsive to motion to make ON to OFF and OFF to ON transitions, circuitry responsive to an OFF to ON transition of said motion responsive switch to cause illumination of said at least one LED, and responsive to an ON to OFF transition to extinguish said LED.

2. In combination as claimed in claim 1 wherein said motion responsive switch comprises a fixed contact and a resilient contact adapted to move resiliently into and out of contact with the fixed contact.

3. In combination, a gear shift knob body and a gear shift lever, said lever having a free end, said body having a battery, at least one LED, circuitry including a timing circuit, said motion responsive switch having ON and OFF states and being responsive to motion of said gear shift lever to make ON to OFF and OFF to ON transitions, said circuitry being responsive to an OFF to ON transition outside a timing interval to initiate a timing interval, said circuitry being adapted during said timing interval to connect said battery to said LED to light the latter during at least a portion of said interval, said circuitry being adapted outside said timing interval to disconnect said battery from said LED.

4. In combination as claimed in claim 3 wherein said motion responsive switch comprises a fixed contact and a resilient contact adapted to move resiliently into and out of contact with the fixed contact.

5. In combination a gear shift knob and a gear shift lever, said lever having a free end, said body having means for attachment to said free end, said body having a battery, circuitry an LED and a motion responsive switch, responsive to movement of said gear shift lever to time a timed interval, said motion responsive switch being a flexible stem switch having a stationary terminal and a flexible terminal adapted to move resiliently into and out of contact with said stationary terminal, said circuitry subject to the closure of said motion responsive switch to cause lighting of said LED for at least a portion of said timed interval.

6. In combination as claimed in claim 1 wherein said motion responsive switch is a flexible stem switch having a stationary terminal and a cantilever terminal which flexes during motion to contact said stationary terminal to and achieve ON state and to separate from said stationary terminal to achieve OFF state.

7. In combination as claimed in claim 3 wherein said motion responsive switch is a flexible stem switch having a stationary terminal and a cantilever terminal which flexes during motion to contact said stationary terminal to achieve ON state and to separate from said stationary terminal to achieve OFF state.

8. In combination as claimed in claim 5 wherein said motion responsive switch is a flexible stem switch having a stationary terminal and a cantilever terminal which flexes during motion to contact said stationary terminal to and achieve ON state and to separate from said stationary terminal to achieve OFF state.

9. A combination as claimed in claim 1 where at least one LED is arranged to illuminate one end of at least one optic fibre, where said optic fibre is treated to cause a proportion of the rays travelling longitudinally therealong to radiate transversely.

10. A combination as claimed in claim 3 where at least one LED is arranged to illuminate one end of at least one optic fibre, where said optic fibre is treated to cause a proportion of the rays travelling longitudinally therealong to radiate transversely.

11. A combination as claimed in claim 5 where at least on LED is arranged to illuminate one end of at least one optic fibre, where said optic fibre is treated to cause a proportion of the rays travelling longitudinally therealong to radiate transversely.

12. A combination as claimed in claim 1 where said at least one LED is encapsulated in clear plastic which also contains at least one optic fibre, where said LED is arranged to illuminate one end of said fibre, and said fibre is treated to cause radiation travelling longitudinally along said fibre to cause radiation transversely therefrom relative to the longitudinal direction of said fibre.

13. A combination as claimed in claim 3 where said at least one LED is encapsulated in clear plastic which also contains at least one optic fibre, where said LED is arranged to illuminate one end of said fibre, and said fibre is treated to cause radiation transversely therefrom relative to the longitudinal direction of said fibre.

14. A combination as claimed in claim 5 where said at least one LED is encapsulated in clear plastic which also contains at least one optic fibre, where said LED is arranged to illuminate one end of said fibre, and said fibre is treated to cause radiation transversely therefrom relative to the longitudinal direction of said fibre.

15. A combination as claimed in claim 12 where said clear plastic contains indicia and said transverse radiation illuminates said indicia.

16. A combination as claimed in claim 13 where said clear plastic contains indicia and said transverse radiation illuminates said indicia.

17. A combination as claimed in claim 14 where said clear plastic contains indicia and said transverse radiation illuminates said indicia.

18. In combination as claimed in claim 3 including means to control the ON-OFF state of said LED during said timed interval.

* * * * *